5 Sheets—Sheet 1.

R. HOFFHEINS.

HARVESTER.

No. 1,888. Reissued Feb. 28, 1865.

Witnesses:
Charles Smith
T. Whittlin

Inventor:
R. Hoffheins
By Munn & Co

5 Sheets—Sheet 2.

R. HOFFHEINS.

HARVESTER.

No. 1,888. Reissued Feb. 28, 1865.

Witnesses:
Charles Smith
O. Hunter

Inventor:
R. Hoffheins
By Dennis Atty

R. HOFFHEINS.

HARVESTER.

No. 1,888. Reissued Feb. 28, 1865.

Witnesses:
Charles Smith
O. Shinks

Inventor:
R. Hoffheins
By [illegible] Atty

R. HOFFHEINS.

HARVESTER.

No. 1,888. Reissued Feb. 28, 1865.

Witnesses:

Charles Smith

J. Hunter

Inventor:

R. Hoffheins

By Munn & Co

Attys

R. HOFFHEINS.

HARVESTER.

No. 1,888. Reissued Feb. 28, 1865.

Witnesses:

R. T. Campbell,
A. Schaefer

Inventor:

R. Hoffheins
by his Attys
Mason & Fenwick & Lawrence

UNITED STATES PATENT OFFICE.

REUBEN HOFFHEINS, OF DOVER, PENNSYLVANIA.

IMPROVEMENT IN HARVESTERS.

Specification forming part of Letters Patent No. 40,481, dated November 3, 1863; Reissue No. 1,888, dated February 28, 1865.

DIVISION A.

*To all whom it may concern:*

Be it known that I, R. HOFFHEINS, of Dover, in the county of York and State of Pennsylvania, have invented a new and useful Improvement in Harvesters; and I do hereby declare that the following is a full, clear, and exact description of the same, reference being had to the accompanying drawings, forming part of this specification, in which—

Figure 1:
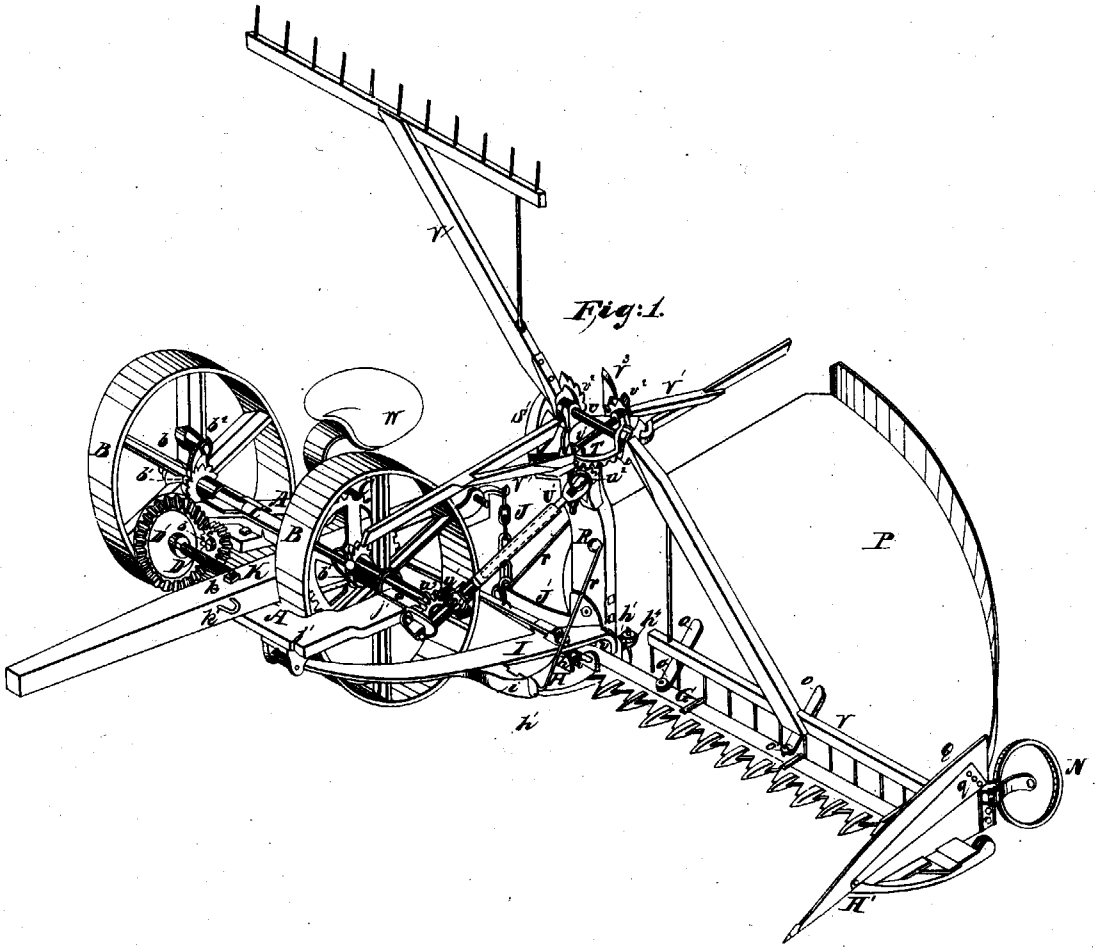
Figure 2:
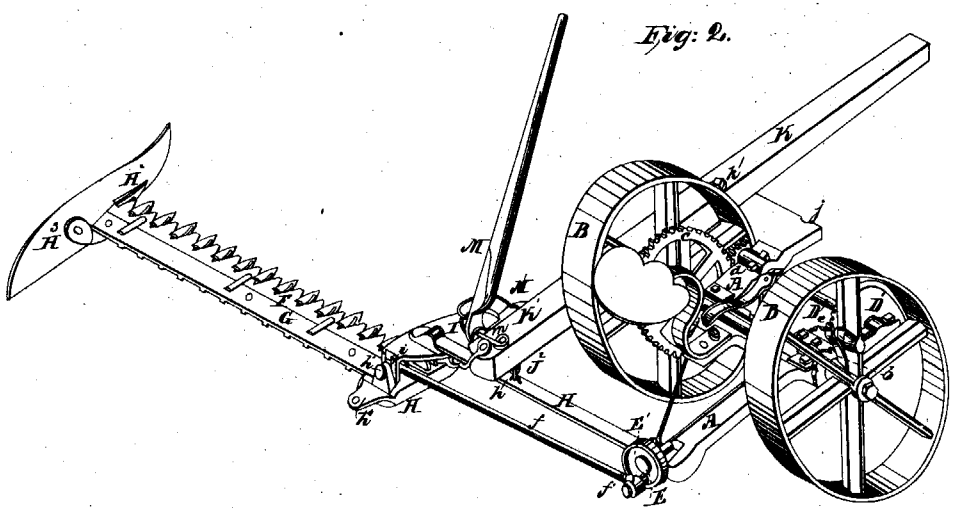
Figure 3:
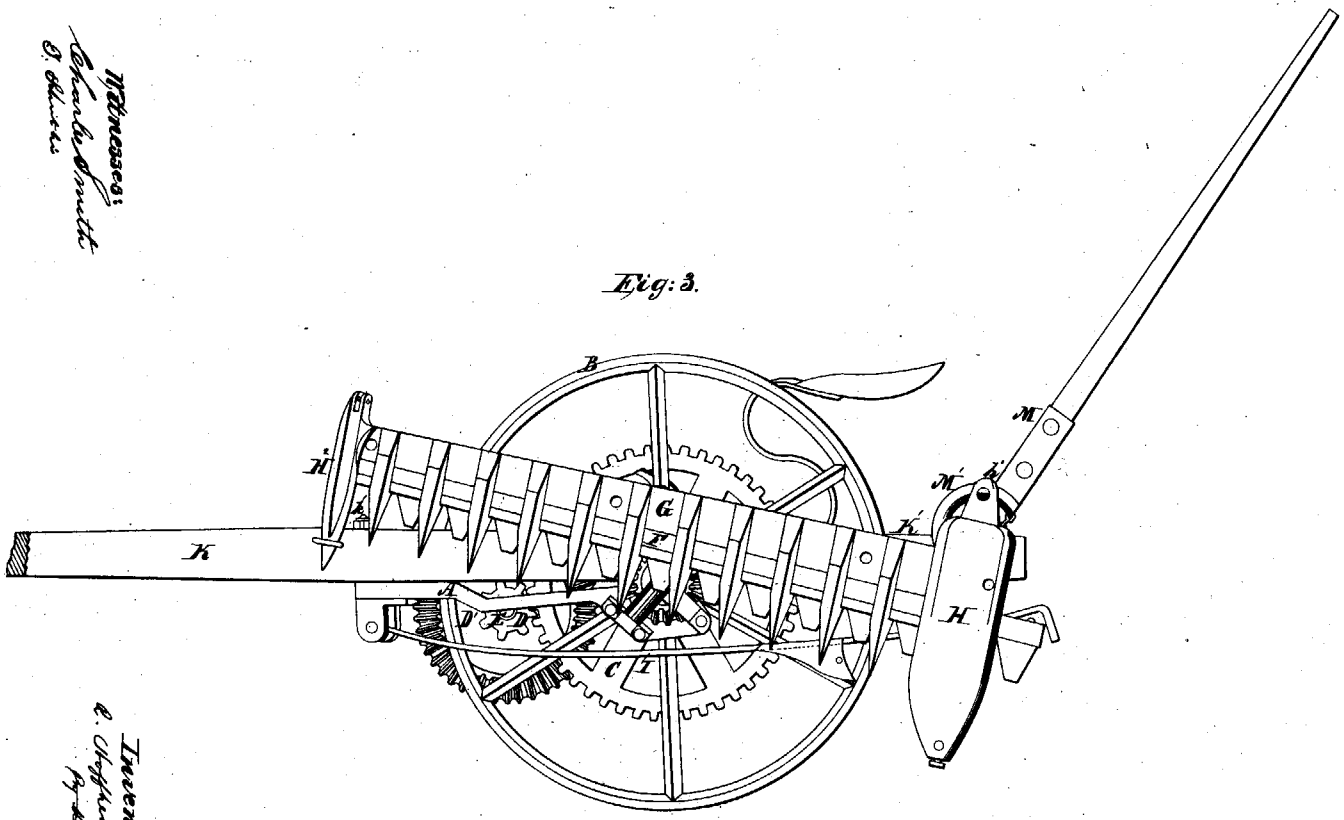
Figure 4:
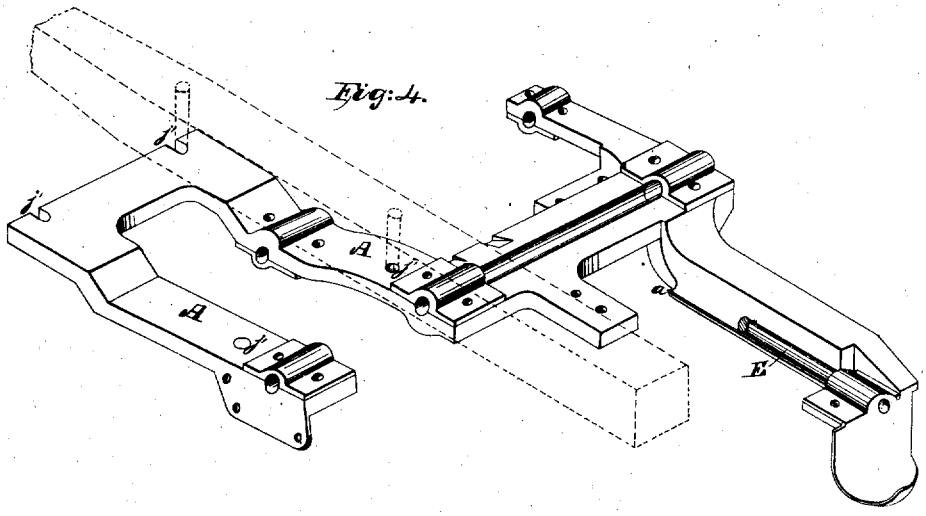
Figure 5:
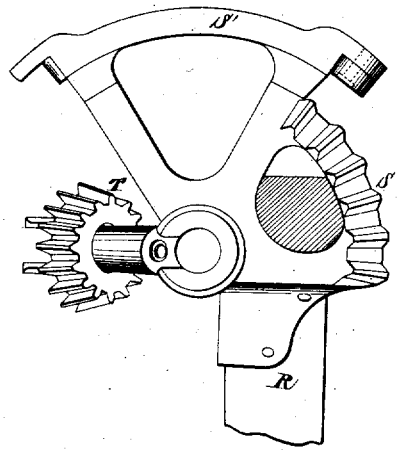
Figure 6:
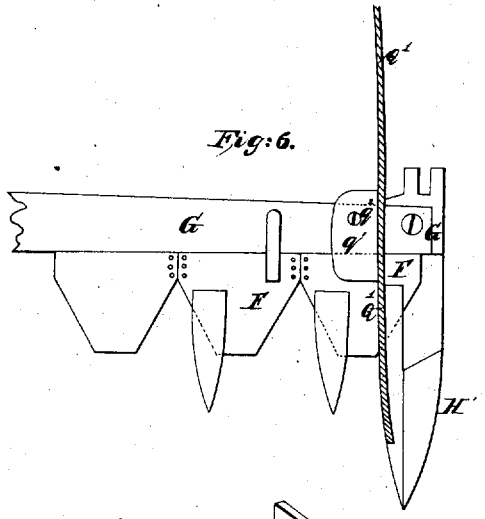
Figure 7:
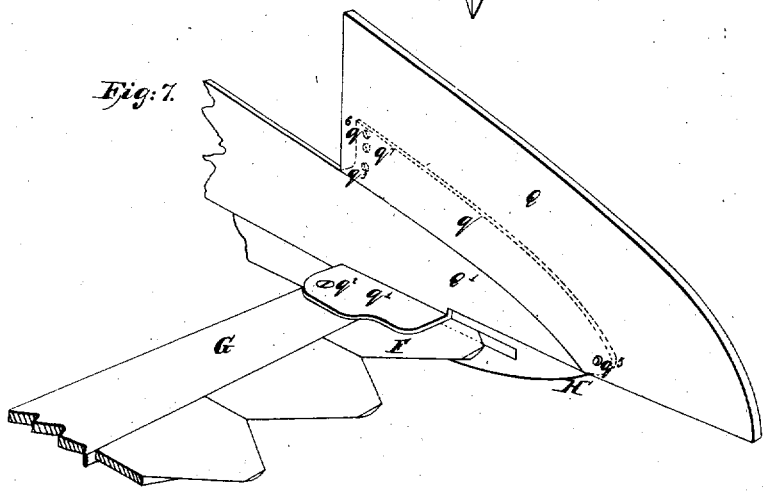

Figure 1 is a front perspective view of my improved machine as arranged for cutting grain. Fig. 2 is a rear perspective view of the same in the form of a mower. Fig. 3 is a side elevation of the same as arranged for transportation. Fig. 4 is a perspective view of the main frame detached. Fig. 5 is a plan of the top of the post on which the rake is mounted. Figs. 6 and 7 are views of the outer divider.

The invention embraced under this patent relates to the harvester whether used as a self-raker or otherwise.

My first improvement consists in a novel construction of draft-frame with reference to the gearing and double driving or supporting wheels.

My second improvement consists in a device for affording protection to the main crank-shaft and strengthening the main frame.

My third improvement consists in a novel manner of employing a removable tongue or draft-pole upon both the inner and outer sides of the inner drive-wheel, whereby the machine is very effectually, in connection with other changes made, adapted for either mowing or reaping at will.

My fourth improvement consists in a device for permitting the finger-beam to turn freely, so as to elevate the points of the fingers or depress the same, and also so as to permit the finger-beam to accommodate itself to the surface of the ground and during such movements afford a bracing support horizontally to the finger-beam, the said device also permitting the cutting apparatus to be turned up edgewise and carried on the machine, all substantially as will be hereinafter described.

My fifth improvement consists in supporting the weight of the cutting apparatus and all attachments thereof at a point between the two drive-wheels by means of devices which will be hereinafter described.

My sixth improvement consists in constructing the inner shoe with a rear extension, forming a means of attachment between the cutting apparatus and the platform, and with lugs or ears, which form a means of attachment by a compound joint to the pendulous drag-bar, all as will be hereinafter described.

My seventh improvement consists in providing for changing the draft of the machine from the inner to the outer side of the outer drive-wheel, and vice versa, and at the same time providing for changing the point of support of the cutting apparatus, as will be hereinafter described.

My eighth improvement consists in a combined guide and fender support, made in one piece in such manner that it serves as a means whereon to adjust the fender, and also, through the aid of an inner horizontal wing, forms a guide for the outer end of the short grain sickle, thus obviating the necessity in a combined machine of substituting a reaper finger-beam for the mower finger-beam, and vice versa, in order to effectually cut both grain and grass with the one machine.

My ninth improvement consists in the manner hereinafter described of arranging a compound swivel-joint on a drag-bar suspended from the rear near side and front off side corners, or thereabout, of the gearing-frame, the said joint and drag-bar forming the connection of the cutting apparatus with the gearing-frame in such manner as to permit the cutting apparatus to turn on its axis to elevate or depress the points of the guard-fingers, or to fold the beam against the frame for transportation, and also allow the cutting apparatus to accommodate itself to undulations of the ground while the grain is being cut, all as will be hereinafter described.

In order that others skilled in the art to which my invention appertains may be enabled to fully understand and use my invention, I will proceed to describe its construction and operation, with reference to the drawings.

The main frame A A is cast in one piece in the form represented in Fig. 4, the ends thereof being left disconnected or open to facilitate casting and to reduce the weight.

B B′ are two drive or supporting wheels, adapted to turn on the axle C, but one or both furnished with a pawl, $b$, taking into a ratchet-wheel, $b'$, on the axle so as to impart rotation thereto when the wheel is turning forward.

$b^2$ represents a spring bearing against the square heel of the pawl $b$ to hold it either in or out of gear in whichever position it may be set.

C′ is the main gear-wheel on the axle C, which gears with a pinion, $d$, on the transverse shaft D, which carries at its other end a bevel cog-wheel, D′, gearing with a bevel-pinion, $e$, on the crank-shaft E.

E′ is the crank-wheel, mounted on the rear end of the shaft E, and imparting motion to the cutter F by means of a pitman, $f$, which is provided with a swivel, $f'$, formed of a screw-thread and nut to permit the rolling of the finger-beam without straining or binding the cutter.

$a$ represents a flange cast upon the main frame A, for the purpose of imparting additional strength thereto, and also protecting the crank-shaft E.

G is the finger-beam, attached at its respective ends to the inner shoe, H, and the outer shoe or divider, H′. The inner shoe, H, is pivoted by its center at $h$ to the drag-bar I by a universal joint, and at its respective ends to guides $h'$ $h'$, which work in vertical dovetail slots formed in pendants $i$ $i$ on the drag-bar, in such a manner as to brace the beam horizontally, while permitting it to turn freely on its axis, either for conforming to the undulations of the ground to rise over an obstruction, or to be turned up edgewise, and carried on the machine in manner as represented in Fig. 3, in which position the point of the divider rests in a staple, $k$, which is in the side of the tongue K.

The tongue is attached to the main frame A by means of two bolts, K′, passing through it and through notches or holes $j$ $j$ or $j'$ $j'$ at one side of or near the center of the frame, so as to permit the adjustment of said tongue to a position between the wheels for cutting grain, as illustrated in Fig. 1, or on the outside for cutting grass, as illustrated in Fig. 2. In either case or position an extension, K′, from the tongue affords a means for supporting the inner end of the finger-beam. This is effected in the illustration given in Fig. 1 by a chain, J, rising from the outer end of a rigid arm, J′, which projects inward from the beam, and in the illustration given in Fig. 2 it is effected by a chain, $J^2$, attached at its lower end to a staple, $h^2$, in the lateral stay-rod $H^2$ and at its upper end to a segment-lever, M, fulcrumed at $m$ on the rear end of the tongue, so that by raising the said lever the heel of the beam may be raised to any required height. A rack, M′, holds the lever M in any position in which it may be placed.

$H^3$ represents a track-clearer, attached to the divider or outer shoe, H′, when the machine is used for mowing. This device is removed when the machine is used for reaping, and the combined guide and fender-support substituted for it, as shown in Figs. 1, 6, and 7. On the rear end of the inner shoe is formed a lug, $h^4$, for the attachment of the inner side of the segmental grain-platform P. The said platform is secured to the finger-beam at suitable intervals by straps O and bolts $o'$.

N represents a caster-wheel secured adjustably to the outer edge of the platform, and employed to carry the same at any desired height.

Q represents a fender or divider on the outer side of the machine.

Q′ is the metallic seat or support for fender. This seat is placed on top of the outer shoe, H′, and forms therewith a spear-point. From the inner side, at the bottom of the support, a horizontal wing or flange, $q'$, is formed or cast. This flange bolts down upon the finger-beam G, as shown at $q^2$, and also extends forward over (but free of) the sickle, and thus answers a twofold purpose: first, as a means whereby to fasten the support and its connections to the finger-beam; second, as a guide to the outer end of a grain-sickle, it in this office rendering a short sickle capable of working on a long finger-beam. The flange is so thin and so arranged that it offers but little obstruction to the falling grain. By its use the fender or dividing device may be thin and all necessity of bulging out the shoe or dividing device as it recedes back from the point is obviated.

The support is formed or cast with a horizontal shoulder at $q^3$, so that the fender or dividing-piece Q may be seated in line with the guard around the platform. It also has a vertical extension, $q$, (shown by dotted lines in Fig. 7 and in full in Fig. 1,) and to this extension the fender or dividing-piece is pivoted, as at $q^5$, and connected at its other or rear end by means of a set-screw, as at $q^6$. The object of this arrangement is to allow the fender to be elevated at its rear end to different inclinations. The set-screw is inserted into one or another of the series of holes $q^7$ when the changes are made.

I have shown in the drawings a combined raking and reeling device; but as this application only embraces invention which is to be used irrespective of its connection with any kind of rake, or without reference at all to a rake, I do not deem it necessary to describe particularly the rake and reel. The rake and reel shown will, however, be found well adapted for use with the invention described.

W represents the driver's seat, mounted upon the main frame in any convenient position.

From the foregoing description it will be seen that by the use of the rigid arm projecting inward from the finger-beam to a position beyond the inner drive-wheel, and supporting the latter with the platform if it be attached from the rear of the tongue, the abruptness of the motions of the cutting apparatus and platform will be greatly diminished without restricting their freedom in conforming to undulations of the ground. This is due in a great measure to supporting the weight at a point which is between the two drive-wheels. This advantage especially results when the machine is used as a reaper, as illustrated in Fig. 1.

In mowing, the cutters are left perfectly free to rise and fall, but are raised and lowered by the operator in the manner already explained, the tongue being transferred to a position on the outside of the wheel B′. The peculiar attachment and construction of the inner shoe adapt the finger-beam to roll freely on its axis while mowing, or to be turned up edgewise and folded compactly against the frame, as illustrated in Fig. 3, so that the machine may be moved from place to place.

The pawl-and-ratchet connection between the drive-wheels and their axle adapt the machine to be turned or backed with perfect freedom, and also afford ready means for throwing the entire machinery out of gear, which is effected by raising the pawls out of the ratchets, where they will be held by the springs $b^2$.

The cutting apparatus may be thrown out of gear by moving the transverse shaft D longitudinally by a lever, $D^2$, and providing it with a pin, $d^2$, which in one position of the shaft will fit in a recess in the hub of the wheel, so as to impart rotation thereto, and in the other position will permit the shaft to turn independently of the wheel. This lever may be moved by the hand or foot of the driver.

The outer divider, by its peculiar construction, answers as a means whereby to adapt a long mowing-machine finger-beam for use with a short grain sickle. This end may have been attained, but not in the manner and by the means shown by me.

Having thus described my invention, what I claim, and desire to secure by Letters Patent, is—

1. The main frame and gear-frame A A, constructed substantially as represented in Fig. 4 and herein described.

2. The main frame and gear-frame A A, constructed open at each end, in combination with shafts, gearing, and double drive-wheels, arranged and operating substantially as and for the purposes specified.

3. The flange *a*, cast or formed upon the gear-frame for the combined purposes of strengthening the latter and protecting the crank-shaft E, substantially as described.

4. The movable tongue K, adapted to be attached to the frame on either side of the wheel B′, and employed to support or raise the inner end of the cutting apparatus, substantially as described.

5. Providing for the attachment of the tongue or draft-pole of a harvesting-machine upon a draft-frame on both the inner and outer side of the drive-wheel B′, in combination with the provision made for changing the point of support of the cutting apparatus from the inner to the outer side of the drive-wheel B′, and vice versa, substantially as and for the purpose set forth.

6. Attaching the cutting apparatus by means of the compound swivel-joint, substantially as described, to the drag-bar I, arranged as described, for the purpose set forth.

7. The combination of the transverse swivel-joint and bracing-guides $h'$, substantially as and for the purpose set forth.

8. The inner shoe constructed with the rear extension, $h^4$, forming a means of attachment between the cutting apparatus and the platform, and with a means of attachment between it and a pendulous drag-bar, so as to form a joint-connection therewith, all substantially in the manner and for the purposes herein described.

9. The combined fender-support and grain-sickle guide, made in one piece and applied substantially in the manner and for the purpose set forth.

10. The rigid arm projecting inward from the finger-beam to a position beyond the wheel B′, in combination with a suspending device and an extension of the tongue or draft-pole, substantially as and for the purposes set forth.

REUBEN HOFFHEINS.

Witnesses:
R. T. CAMPBELL,
E. SCHAFER.